Jan. 1, 1952  S. C. WRIGHT  2,580,637
TROUGH OR TANK WATER LEVEL VALVE
Filed Sept. 27, 1948
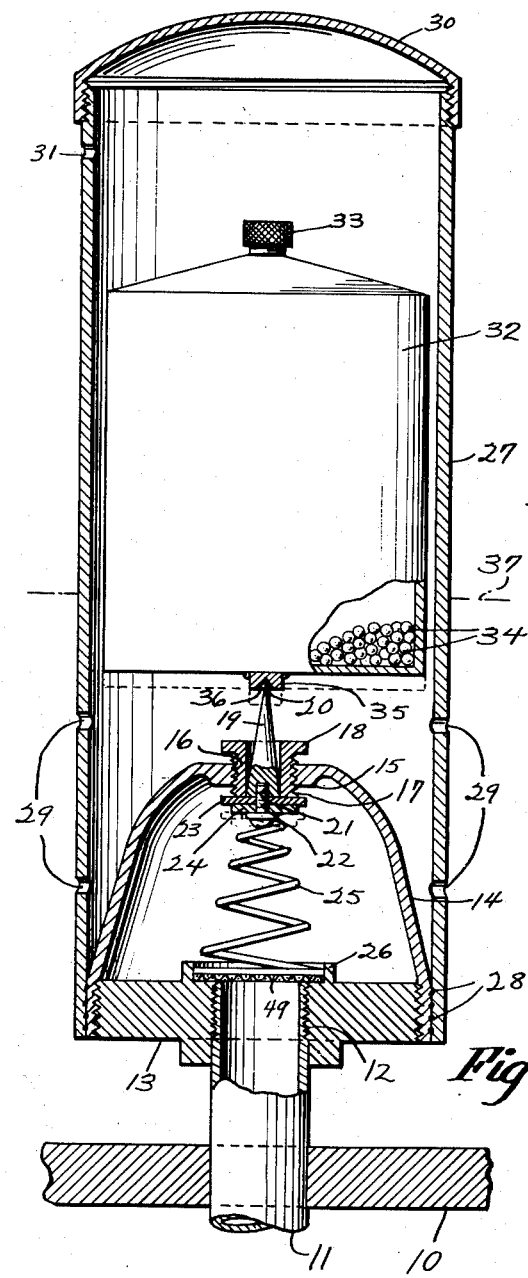
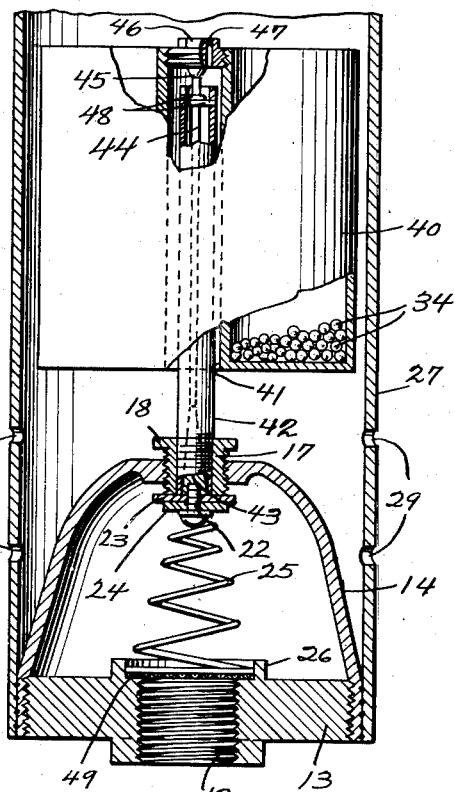
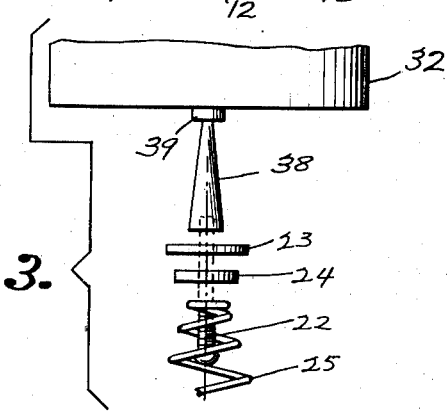
INVENTOR.
Smith C. Wright
BY
Mawhinney & Mawhinney
Attorneys Patented Jan. 1, 1952

2,580,637

UNITED STATES PATENT OFFICE 2,580,637

TROUGH OR TANK WATER LEVEL VALVE

Smith C. Wright, Bandera, Tex.

Application September 27, 1948, Serial No. 51,370

6 Claims. (Cl. 137—104)

1

The present invention relates to improvements in trough or tank water level valves for regulating the flow of water into stock watering troughs, water closets, commode tanks and the like and has for an object to provide a device of this character which is an improvement over that disclosed in my Patent No. 2,477,224, entitled Trough or Tank Water Level Valve.

Another object of the present invention is to provide an improved valve which is easier to manufacture, will fill the tank much quicker and will be easier and more economical to maintain than the types of valves disclosed in the above named application.

A further object of the present invention is to provide an improved structure in which a housing supports an adjustable valve seat and protects the valve from the entrance of foreign matter.

A still further object of the present invention is to provide an improved device of this kind in which the valve is automatically opened by the weight of the float when the water level in the tank falls below a preselected level. With the present structure levers or hinges are not required for the proper operation of the valve. The need for packing and packing nuts is eliminated.

With the foregoing and other objects in view, the invention will be hereinafter more fully described and more particularly pointed out in the appended claims.

In the drawings in which the same parts are denoted by the same reference numerals throughout the several views, Figure 1 is a vertical sectional view of the improved valve shown as applied to an animal watering trough with parts broken away and parts shown in section, Figure 2 is a fragmentary vertical sectional view of a modified form of the improved valve, and Figure 3 is an enlarged exploded view of another modified form of the valve and showing a portion of the float.

Referring more particularly to the drawings, 10 designates the bottom of a water or other liquid tank which is shown as a drinking water trough for livestock or other domestic animals. One end of a stand-pipe 11 is adapted to be connected to a suitable water supply and its opposite end portion extends through an opening in the bottom 10 of the tank and is exteriorly screw threaded for reception by a screw threaded centrally disposed through bore 12 of an adapter 13

2 to provide a water-tight joint between the pipe and the adapter.

The adapter 13 is annular in cross section and is exteriorly screw threaded to engage the interior screw threads of a valve housing 14 to form a water-tight joint. The valve housing 14 is dome shaped and has its top strengthened by a boss 15. The top of the valve housing has a screw threaded opening 16 therethrough for adjustably receiving an exteriorly screw threaded valve seat 17 which is in the form of a sleeve and has an annular flange 18 for receiving a wrench or the like for adjusting the valve seat and for limiting the inward movement of the valve seat with respect to the valve housing 14. The joint between the valve seat 17 and the valve housing 14 is water-tight.

A cone shaped valve core 19 is operatively received by the sleeve like valve seat 17 and its upper pointed end 20 extends outwardly of and above the flange 18 of the valve seat 17. The lower end or base of the valve core 19 has a centrally disposed screw threaded socket 21 which receives a screw 22. A leather washer 23 encircles the shank of the screw 22 and the diameter of the washer 23 is such that the washer extends beyond the face of the valve seat 17 for a substantial distance. A brass washer 24 also encircles the shank of the screw 22 and its diameter is substantially the same as the outside diameter of face of the valve seat 17. When the screw 22 is screwed home in its socket 21 the head of the screw will retain the washers 23 and 24 in place to constitute a valve head.

For normally urging the valve core 19 and the leather washer 23 to closed position, a coiled spring 25 the strength of which is guaged by the pressure in the water line, has its upper end disposed between the head of the screw 22 and the brass washer 24 and its lower end engaging a screen filter 49 which is supported by the upper face of the adapter over its bore 12. An upstanding annular flange 26 is formed on the adapter 13 for preventing the lower portion of the spring 25 and the filter 49 from slipping out of place.

A vertically disposed protective cylindrical housing 27 which is open at both ends envelops the valve housing 14 and has its lower end attached to the lower outside surface of the valve housing 14 by spot welding, screw threads or the like 28 so as to form a water-tight joint therebetween. The housing 27 has a plurality of water discharge openings 29 and the upper end of the housing extends above the upper edge of the tank and removably receives a screw threaded cover 30. Immediately below the cover 30, the housing 27 has an air vent 31.

An air-tight float 32 has a working fit within the housing 27 above the valve core 19 and has a removable cap 33. The weight of the float is adjusted by the amount of lead shot or other suitable material 34 which can be introduced into the float 32 when the cap 33 is removed. The bottom of the float 32 has a centrally disposed boss 35 provided with an inverted V-shaped recess 36 for receiving the upper pointed end 20 of the valve core 19 when the water level 37 in the tank falls below a predetermined height.

In the operation of the device, assuming that the tank is empty, the float 32 will fall by gravity so that the recess 36 of the float will receive the upper end 20 of the valve core 19 and the weight of the shot laden float will depress the valve core 19 against the action of the spring 25 to disengage the leather washer 23 from the valve seat 17, thereby opening the valve. The water from the water main will flow through the pipe 11 and bore 12 of the adapter 13 into the housing 27. Water will pass from the housing through the openings 29 into the tank.

When the water has reached the level 37 which has been predetermined by the weight of lead shot 34 previously placed within the float 32, the water in the housing 27 will raise the float by buoyancy out of engagement with the upper end 20 of the valve core 19. The leather washer 23, under the influence of the spring 25 and the pressure of the water from the water main, will return to its seat and the discharge of water to the tank will be stopped. Whenever the water in the tank falls below the preselected level, the float will sink and engage the valve core to open the valve and maintain the valve in its open position until the preselected water level has been reestablished, at which time the float will again be buoyed up and the valve will close. The greater the weight of shot placed in the float the higher will be the water level maintained in the tank.

It will be noted that, since the brass washer 24 is of less diameter than that of the leather washer 23, the brass washer in the closed position of the valve will press the intermediate portion of the leather washer against the valve seat. This will cause the marginal portion of the leather washer to flex downwardly and cause the intermediate portion thereof to bulge upwardly into firmer and closer engagement with the valve seat to effect a better water-tight contact between the valve seat and the leather washer.

It will also be noted that the side surface of the valve core tapers upwardly and therefore gradually recedes from the straight side wall of the passageway of the sleeve like valve seat. Accordingly, the further the valve core is depressed the larger will become the annular passageway between the valve core and the interior wall of the valve seat and the larger the volume of water which can flow from the pipe 11 to the housing 27. Therefore the further the water level falls below the preselected water level, the further will the valve core be depressed and the quicker the preselected water level will be reestablished.

The removal of the cover 30 will afford access to the float. The housing acts as a guide for the float in its up and down movements and protects the valve and the float from damage by the animals using the trough. The housing also prevents dirt and debris from clogging up the valve and the system.

The adjustment of the valve seat will change the strength of the spring and the distance between the point 20 of the core 19 and the boss 35 of the float 32.

In the modification of the invention shown in Figure 3, a valve core 38 similar in construction to the valve core 19 is secured to the boss 39 of the float 32 by welding or the like.

The operation of this form of the invention is similar to the operation of the form shown in Figure 1, except that the float 32 and core 38 move in unison at all times.

In the form of the invention illustrated in Figure 2, a float 40 has a centrally disposed through bore or passageway 41. The lower end of a tube 42 is received within the sleeve-like valve seat 17 and its upper end portion is received by the passageway 41. The internal diameter of the passageway 41 exceeds the outside diameter of the tube 42 sufficiently to provide an annular passage for the water downwardly into the tank and at the same time the tube 42 and the bore 41 will cooperate to guide the float 40 in its vertical movements.

A valve core 43 similar in construction to the valve core 19 has an elongated valve stem 44 which can be formed integrally therewith or secured thereto in any suitable manner. The valve stem 44 extends upwardly from the core 43 through the tube 42 and terminates above the upper end of the tube in a button or head 45. The wall of the upper end portion of the passageway 41 of the float 40 is screw threaded to receive a plug 46 which has an air vent 47. A pair of eyelets 48 for guiding the valve stem 44 are secured to the tube 42.

The operation of this modification of the invention is the same as that of the form shown in Figure 1, except that when the float 40 falls due to the water line falling below the preselected level, the plug 46 will contact the button 45 and depress the valve core 43 through its valve stem 44 and open the valve. The water will move upwardly through the tube 42 and emerge out of the upper end of the tube and flow downwardly through the passageway between the tube 42 and the wall of the bore 41 into the housing 27.

It is obvious that various changes and modifications may be made in the details of construction and design of the above specifically described embodiment of this invention without departing from the spirit thereof, such changes and modifications being restricted only by the scope of the following claims.

What I claim is:

1. For use with an animal drinking trough, commode or the like having a tank for containing water and a stand-pipe connected to a main supply of water, a water level maintainer comprising an adapter having an opening therethrough received over the upper end of said stand-pipe, a frusto-conical valve housing having its lower base edge carried by said adapter and having in its upper portion an opening, a valve seat having a passageway from the interior of the valve housing to the space above the same, a valve core slidable through said passageway and having an upper end extending above the housing, a valve member mounted in the housing and carried by the lower end of said core in position to open and to close against said seat, spring means for biasing said valve member to a closed position against said seat, a float operator in the water in the tank positioned to engage the upper end of said core to open the valve against the action of said spring, and a float housing for confining said float operator to a position above said core, said float housing supported at its lower end from said adapter and having openings in its lower and upper portions.

2. For use with an animal drinking trough, commode and the like having a tank for containing water and a stand-pipe connected to a main supply of water, a water level maintainer comprising an adapter adapted to be attached to the stand-pipe, a valve housing mounted on said adapter and having an opening therethrough, a valve seat mounted in the opening of the valve housing and having a passageway therethrough communicating with the stand-pipe, a valve core movably mounted through said passageway, a flexible washer on the lower end portion of the valve core for engaging the valve seat and having a portion extending beyond the valve seat, a rigid washer fitted against the lower surface of said flexible washer, a fastening pressing the rigid washer against the flexible washer, said rigid washer being of less diameter than that of the flexible washer so that the rigid washer will cause the extending portion of the flexible washer to flex downwardly, whereby the intermediate portion of the flexible washer will bulge upwardly into close contact with the valve seat, means for normally urging the flexible washer against the valve seat, and a float operator disposed in the water in the tank above the housing in position to descend on the valve core for unseating the flexible washer when the water level in the tank falls below a preselected level.

3. For use with a container for water and a stand-pipe connected to a source of water supply, a water level maintainer comprising an adapter having a through bore adapted to receive the stand-pipe, valve means adapted to control the flow of water from the stand-pipe to the container, a resilient element for normally maintaining the valve means in closed position, a screen positioned on the adapter over the bore thereof, said resilient element having one end engaging the valve means and its opposite end engaging the screen, said adapter having a flange embracing the screen and the end of the resilient element which engages the screen for restraining the screen and the resilient element against displacement, and a float operator adapted to be disposed in the container and cooperating with said valve means for opening the valve means.

4. For use with a container for water and a stand-pipe connected to a source of water supply, a water level maintainer comprising an adapter adapted to be attached to the stand-pipe, valve means adapted to control the flow of water from the stand-pipe to the container, a resilient element for normally maintaining the valve means in closed position, a float operator adapted to be disposed in the container and cooperating with said valve means for opening the valve means against the action of the resilient element, and a protective housing supported by said adapter for encasing the float operator and the valve means, said protective housing having water discharge openings therein.

5. In combination, a tubular member for communicating with a source of water supply and with a container for water, said tubular member having a valve seat, a valve stem movably mounted through said tubular member, a flexible washer on said valve stem having an intermediate portion for engaging the valve seat and having a portion extending beyond the valve seat, a rigid washer fitted against the intermediate portion of the flexible washer, a fastening pressing the rigid washer against the flexible washer, resilient means engaging the rigid washer urging the rigid washer against the flexible washer to normally press the flexible washer against the valve seat, whereby the pressure of the rigid washer will cause the extending portion of the flexible washer to flex away from the valve seat and the intermediate portion of the flexible washer to bulge into close contact with the valve seat, and a float operator cooperating with the valve stem for unseating the flexible washer when the water level in the container falls below a preselected level.

6. For use in float operated liquid level maintainers in liquid containing tanks, an adapter having an opening adapted to receive therethrough the liquid from a source of liquid supply and having a confining flange upstanding from the adapter in radially-spaced relation to the adapter opening, a screen within the flange seated on the adapter and extending across said adapter opening, a valve housing on the adapter having a liquid discharge opening spaced from the adapter opening, a valve seat inwardly of the liquid discharge opening, a valve in the housing movable toward and from the seat, spring means seated at its inner end upon said screen within said confining flange and at its outer end engaging the valve to bias the valve to closed position upon its seat, and a stem on the valve projecting through the liquid discharge opening of the housing adapted to be engaged by the float to open the valve.

SMITH C. WRIGHT.

REFERENCES CITED

The following references are of record in the file of this patent:

UNITED STATES PATENTS

| Number | Name | Date |
|---|---|---|
| 741,557 | Seymour | Oct. 13, 1903 |
| 913,554 | Parton | Feb. 23, 1909 |
| 1,147,800 | Ihrig | July 27, 1915 |
| 1,259,791 | Simmons | Mar. 19, 1918 |
| 1,982,062 | Matthews | Nov. 27, 1934 |
| 2,075,582 | Jolly | Mar. 30, 1937 |
| 2,081,878 | Witter | May 25, 1937 |
| 2,251,086 | Van Dyke | July 29, 1941 |
| 2,348,757 | Samiran | May 16, 1944 |